(12) United States Patent
Sagara et al.

(10) Patent No.: US 8,339,960 B2
(45) Date of Patent: Dec. 25, 2012

(54) CONGESTION CONTROL SYSTEM

(75) Inventors: Takahiro Sagara, Ebina (JP);
Masafumi Kinoshita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 12/684,661

(22) Filed: Jan. 8, 2010

(65) Prior Publication Data

US 2010/0182909 A1 Jul. 22, 2010

(30) Foreign Application Priority Data

Jan. 20, 2009 (JP) ................ 2009-009449

(51) Int. Cl.
*G01R 31/08* (2006.01)
*H04B 7/14* (2006.01)
*H04B 7/212* (2006.01)

(52) U.S. Cl. .............. 370/235; 370/315; 370/324

(58) Field of Classification Search .............. None
See application file for complete search history.

(56) References Cited

U.S. PATENT DOCUMENTS 7,239,609 B2   7/2007 Yokota et al.
2008/0225718 A1*  9/2008 Raja et al. ........... 370/235
2009/0323581 A1* 12/2009 Masuda ............... 370/315

OTHER PUBLICATIONS

L. Massoulie et al., "Arguments in favour of admission control for TCP flows," Teletraffic engineering in a competitive world, 1999, vol. 3a & 3b, pp. 33-44.

* cited by examiner

*Primary Examiner* — Kwang B Yao
*Assistant Examiner* — Jutai Kao
(74) *Attorney, Agent, or Firm* — McDermott Will & Emery LLP

(57) ABSTRACT

A congestion control system is provided between a terminal and a server device to avoid a congestion state in the server device by preferentially regulating the request with a high load on the server device. The congestion control system estimates the load of the request from the terminal to be placed on the server device for the next communication sequence, based on the response from the server device to the request from the terminal, and adds the estimated load information to the response to the terminal. Subsequently, the request from the terminal includes the load information, so that the congestion control system controls the regulation of the request from the terminal based on the load information included in the request.

10 Claims, 21 Drawing Sheets

| REQUEST STATE | Initialize | D82 |
|---|---|---|
| DESTINATION NUMBER | 8 | D84 |
| LOAD LEVEL | 5 | D86 |
| REQUEST TRANSMISSION TIME | 1215483448 | D88 |

| DESTINATION SERVER | DESTINATION DATABASE | DESTINATION NUMBER | AVERAGE RESPONSE TIME |
|---|---|---|---|
| http://serverA | calendar | 1 | 100 |
|  | ⋮ | ⋮ | ⋮ |
|  | photo | 8 | 600 |
| http://serverB | calendar | 9 | 150 |
|  | ⋮ | ⋮ | ⋮ |
|  | movie | 14 | 1100 |

FIG.5

| STATE NAME | AVERAGE RESPONSE TIME | ADJUSTMENT PARAMETER |
|---|---|---|
| Initialization | 40 | 0 |
| Two-way sync | 150 | 0 |
| Slow sync | 2000 | 0 |
| One-way sync from client | 200 | -100 |
| ⋮ | ⋮ | ⋮ |
| mapping | 50 | 0 |

FIG. 6

```
POST /syncml/sync?loadinfo=LTY0Li04OC41LjgzLTEy HTTP/1.1
Accept: */*
Content-Type:application/vnd.syncml+xml   M102
Host: 127.0.0.1

<?xml version="1.0"encoding="UTF-8"?>
<SyncML>
<SyncHdr><VerDTD>1.1</VerDTD>
        <VerProto>SyncML/1.1</VerProto>
        <SessionID>1208832495</SessionID>
        <MsgID>3</MsgID>
        <Target><LocURI>http://127.0.0.1dsync</LocURI>
        </Target>
        <Source><LocURI>1307660</LocURI></Source>
</SyncHdr>
<SyncBody>
        <Status>
        <CmdID>1</CmdID><MsgRef>2</MsgRef>
        <CmdRef>0</CmdRef><Cmd>SyncHdr</Cmd>
        <TargetRef>http://127.0.0.1/dsync</TargetRef>
        <SourceRef>1307660</SourceRef>
        <Data>200</Data>
        </Status>
        <Alert><CmdID>2</CmdID>
        <Data>222</Data>
        <Item><Target><LocURI>scal</LocURI></Target>
        <Source><LocURI>calendar</LocURI></Source>
        </Item></Alert>
</SyncBody>
</SyncML>
```

```
HTTP/1.1 200 OK
Content-Type:application/vnd.syncml+xml
Date: Tue, 22 Apr 2008 02:43:52 GMT <?xml version="1.0"encoding="UTF-8"?>
<SyncML>
<SyncHdr>
          <VerDTD>1.1</VerDTD><VerProto>SyncML/1.1</Verproto>
          <SessionID>1208832495</SessionID>
M202      <MsgID>1</MsgID>
          <Target><LocURI>1307660</LocURI></Target>
M204      <Source>
          <LocURI>http://127.0.0.1/dsync</LocURI>
M208      </Source>
          <RespURI>http://127.0.0.1/dsync?loadinfo=LY0i0</RespURI>
</SyncHdr>
<SyncBody>
          <Status>
          ···OMITTED···
          </Status>
          <Alert>
M210      <CmdID>2</CmdID>
          <Data>200</Data>
          <Item><Target><LocURI>calendar</LocURI></Target>
          <Source><LocURI>scal</LocURI></Source>
          <Meta>                      M206
          ···OMITTED···
          </Meta>
M212      </Item></Alert>
          <Final></Final>
</SyncBody>
</SyncML>
```

FIG.15

```
HTTP/1.1 200 OK
Content-Type:application/vnd.syncml+xml
Date: Tue, 22 Apr 2008 02:43:52 GMT <?xml version="1.0"encoding="UTF-8"?>
<SyncML>
<SyncHdr>
    ···OMITTED···
    <RespURI>http://127.0.0.1/dsync?loadinfo=HtC14o</RespURI>
</SyncHdr>
<SyncBody>
        <Status>
          ···OMITTED···
        <Data>417</Data>
        </Status>
</SyncBody>
</SyncML>
```

RESPONSE INCLUDING COOKIE  M400

```
HTTP/1.1 200 OK
Content-Type: application/vnd.syncml+xml
Date: Tue, 22 Apr 2008 02:43:52 GMT
Set-Cookie: loadinfo=sNk9xYbsA  ~M402

<?xml version="1.0"encoding="UTF-8"?>
<SyncML>
    ···OMITTED···
</SyncML>
```

REQUEST INCLUDING COOKIE  M500

```
POST   /syncml/sync HTTP/1.1
Accept: */*
Content-Type: application/vnd.syncml+xml
Host: 127.0.0.1
Cookie: loadinfo=sNk9xYbsA  ~M502

<?xml version="1.0"encoding="UTF-8"?>
<SyncML>
    ···OMITTED···
</SyncML>
```

HTTP/1.1 200 OK
Content-Type:application/vnd.syncml+xml
Date: Tue, 22 Apr 2008 02:43:52 GMT <?xml version="1.0"encoding="UTF-8"?>
<load>
<message_state>
    <name="Initialization" load="10"/>
    <name"One-way sync" load="20"/>
    ···OMITTED···
    <name"Mapping" load="5"/>
</message_state>
<database>
    <name="calendar" load="5"/>
    <name="photo" load="10"/>
    ···OMITTED···
    <name="movie" load="20"/>
</database>
</load>
```

FIG.21

| STATE NAME (D42) | LOAD STATE (D52) | ADJUSTMENT PARAMETER (D46) |
|---|---|---|
| Initialization | 5 | 0 |
| Two-way sync | 15 | 10 |
| Slow sync | 200 | 0 |
| One-way sync from client | 20 | -100 |
| ⋮ | ⋮ | ⋮ |
| mapping | 5 | 0 |

D50

| DESTINATION SERVER | DESTINATION DATABASE | DESTINATION NUMBER | LOAD STATE |
|---|---|---|---|
| http://serverA | calendar | 1 | 10 |
| | ⋮ | ⋮ | ⋮ |
| | photo | 8 | 60 |
| http://serverB | calendar | 9 | 15 |
| | ⋮ | ⋮ | ⋮ |
| | movie | 14 | 110 |

D22, D24, D26, D32, D30

CONGESTION CONTROL SYSTEM

INCORPORATION BY REFERENCE

This application claims priority based on a Japanese patent application, No. 2009-009449 filed on Jan. 20, 2009, the entire contents of which are incorporated herein by reference.

BACKGROUND

The present invention relates to a congestion control function of a device provided on a terminal communication path in a network system, such as the World Wide Web (WWW), for communicating data between a server device and a terminal.

With the widespread use of mobile terminals, there is an increasing demand for synchronization of data such as schedules between a plurality of terminals such as mobile phones and PCs. It is also expected that with the development of highly functional terminals, the demand for synchronization is further increased with respect to a large amount of contents such as photos and videos. The synchronization of these data is performed by a synchronization server through data synchronization process. However, the load on the data synchronization server is expected to increase sharply as the demand for data synchronization increases. Thus, it is necessary to have a congestion control function to protect the synchronization server from the concentration of requests in order to provide a stable service.

An example of a conventional congestion control function is disclosed in U.S. Pat. No. 7,239,609. This document proposes that a congestion control system is provided on a path between a Web server and a Web client to determine whether the request relayed to the Web server exceeds the estimated processing capacity of the Web server, and to respond to the Web client with the coupling regulation time that is controlled based on the estimated processing capacity of the Web server (in column 2, lines 48 to 59).

SUMMARY

In a communication protocol (for example, SyncML) for synchronizing data between a terminal and a synchronization server, the transaction between the terminal and the synchronization server includes a plurality of requests from the terminal as well as responses from the synchronization server for the requests. As shown in an example of FIG. 25, each request has a state transition (hereinafter referred to as a state). For example, in the communication of state S200 of "Uninitialized", a request of initialization process is performed and a response is normally returned. In this case, the communication moves to state S202 of "Initialized".

The load on the synchronization server is different for each demand state. For this reason, it is effective when the content of the congestion control is changed according to the demand state (see, for example, L. Massoulie and J. Roberts, "Arguments in favor of admission control for TCP FLOWS", ITC16, 1999). However, in this case, it is necessary to analyze each received request to determine the state of the request, causing a significant load to be placed on the congestion control function in the concentration of requests. As a result, it is difficult to provide a congestion control function.

One reason for the congestion in the synchronization server resides in the delay of database processing of the synchronization server. However, the database used for synchronization is different depending on the data to be synchronized, so that it is necessary to take into account the possibility of congestion of requests using a specific database.

The present invention solves the above problem by providing a congestion control system or a synchronization server having a congestion control unit.

The present invention solves the above problem by providing a congestion control system on a network communication path between a terminal and a synchronization server, or by providing a congestion control unit within the synchronization server.

According to the disclosed system, a congestion control system or congestion control unit has a function of estimating the state of the next request from a terminal based on a response from a synchronization server for a request from the terminal. The congestion control system or congestion control unit estimates the level of the load of the next state of the request from the terminal to be placed on the synchronization server (hereinafter referred to as a load level), based on the congestion state for each database, which is the target of the request, as well as the content of the estimated next state of the request.

Further, the congestion control system or congestion control unit adds the estimated load level to a response from the server, and relays the response to the terminal. The terminal includes the load information in a specific portion (for example, the request address of the HTTP) in the next request. In this way, the congestion control system or congestion control unit provides regulatory control, such as rejection or delay of the request, based on the load information included in the request.

Further, in the case of the rejection of the request, the congestion control system or congestion control unit transmits a response indicating the rejection of the request to the terminal, thereby notifying the user of the rejection of the request.

Further, the congestion control system or congestion control unit determines and adjusts the processing capacity for each database as well as the load level of the state of the request, based on repeatedly obtaining the response time from the synchronization server as well as the information notified from the synchronization server.

The congestion control system or congestion control unit determines the load of the request to be placed on the server from a specific portion that can easily be analyzed, instead of analyzing all the request content. Thus, it is possible to provide fast processing even in the concentration of requests.

Further, the congestion control system or congestion control unit preferentially regulates the request that places a high load on the processing of the synchronization server. Thus, it is possible to continue the synchronization service even in the concentration in the synchronization server with requests.

More specifically, an aspect of the disclosed system is a congestion control system provided on a network communication path coupling a terminal and a server device. The congestion control system includes: a repeater for relaying a request from the terminal to the server device and for relaying a response from the server device to the terminal; a determination unit for analyzing the response from the server device to determine the next state of the request from the terminal; a measurement unit for measuring the processing capacity of the server device for each destination of the request from the terminal; an estimation unit for estimating, for each server device, the load of the next request to be placed on the server device, based on the determined next state of the request as well as the measured processing capacity of the server device which is the destination of the request, and for adding the estimated load information to the response of the server device; and a regulation unit for analyzing the load information added to the request received from the terminal, determining whether the request is relayed from the terminal to the server device based on the content of the load information, and when the request is rejected without being relayed to the server device, notifying the terminal that the request is not relayed.

Further, the measurement unit may determine the processing capacity of the server device, based on the result of the measured response time of the specific server device for the request relayed to the server device.

Further, the estimation unit may estimate the load of the request of each state to be placed on the server device, based on the response time of the server device for the request of each state, which is measured by the measurement unit.

Further, the congestion control system may also include a server state obtaining unit for repeatedly receiving from the server device the information about the processing capacity of the server device, as well as the load of the request of each state to be placed on the server device. It is also possible that the server state obtaining unit receives the information about the processing capacity of the server device as well as the load of the request of each state to be placed on the server device, upon notification from the server device.

Further, the congestion control system may also include an encryption/decryption unit for encrypting the load information included in the response to the terminal, and for decrypting the load information included in the request from the terminal.

The termination unit may include a state transition table having a combination of the current state of a request, the presence or absence of a specific tag included in the request, the value of the specific tag included in the request, and the next state of the request, in order to determine the next state of the request based on the state transition table.

When the relay of the request is rejected by the load information included in the request, the regulation unit may determine low-level load information to be included in the next request based on the load information included in the request, and return a regulation response including the load information.

Further, the congestion control system may also include a repeater delay unit for delaying the relay of the request to the server device based on the load information included in the request.

Further, the regulation unit may determine the time of delaying the relay to the server device, based on the congestion state of the server device as well as the load information included in the request. Then, the repeater delay unit may delay the relay of the request to the server device based on the delay time determined by the regulation unit.

According to the teaching herein, it is possible to continue the synchronization service even in the concentration of data synchronization requests, allowing for fast processing of data synchronization.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 is a block diagram of an example of destination management information stored in a storage unit according to the first embodiment;

FIG. 5 is a block diagram of an example of state management information stored in a storage unit according to the first embodiment;

FIG. 6 is a block diagram of an example of a request from a terminal according to the first embodiment;

FIG. 7 is a block diagram of an example of a response from a server device according to the first embodiment;

FIG. 15 is a block diagram of an example of a regulation response transmitted to the terminal by the congestion control system according to the second embodiment;

FIG. 17 is a block diagram of an example of a request from the terminal according to the third embodiment;

FIG. 20 is a block diagram of an example of congestion information received from the server device according to the fifth embodiment;

FIG. 21 is a block diagram of an example of destination management information stored in a storage unit according to the fifth embodiment;

DETAILED DESCRIPTION OF THE EMBODIMENTS

Hereinafter, embodiments of the present invention will be described with reference to the accompanying drawings.

In the following, each embodiment will be described assuming that a congestion control function is provided in a repeater on a network communication path. However, it is also possible that the congestion control function is included in a server device.

First Embodiment

Figure 1:
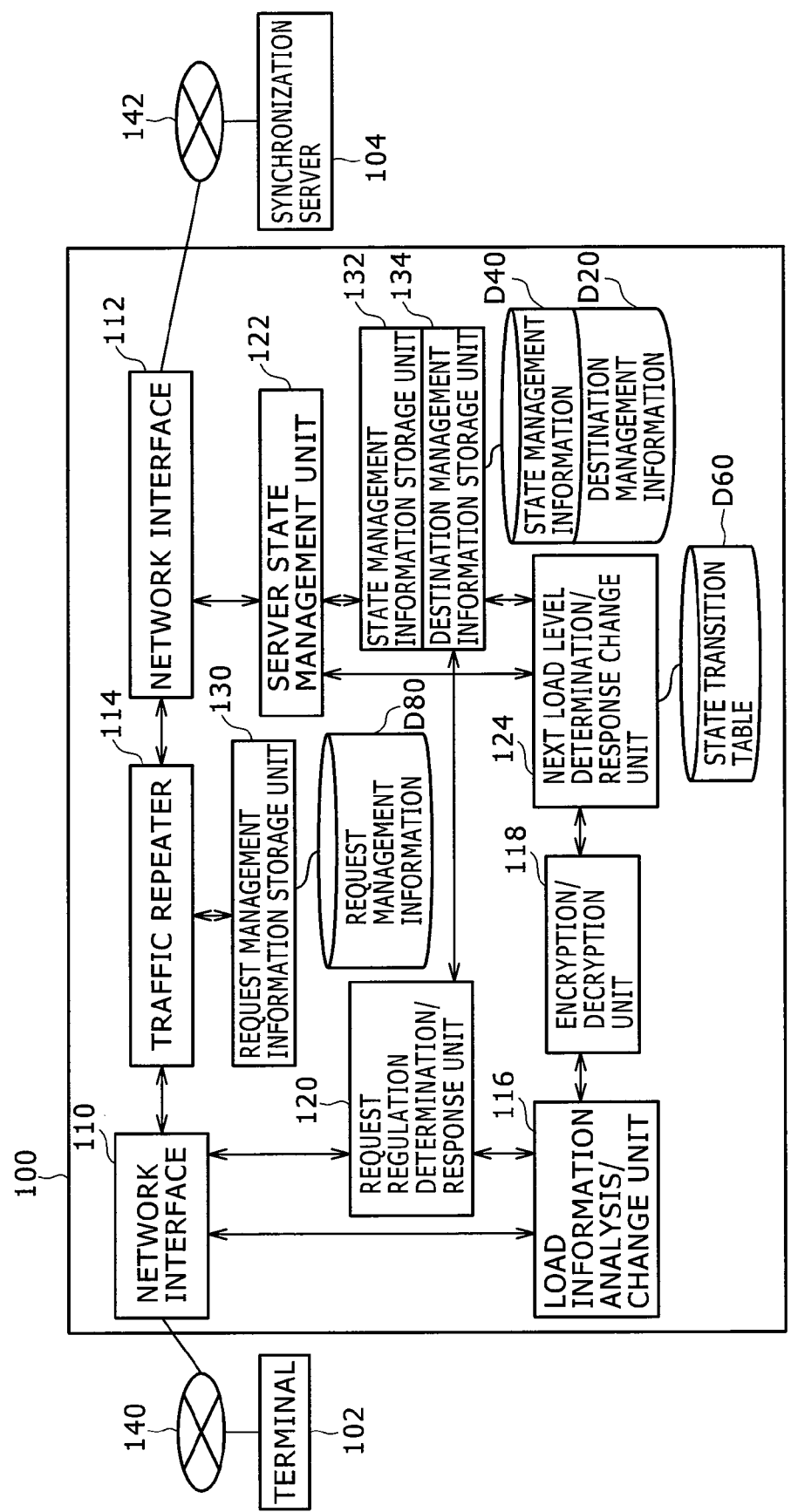
FIG. 1 is a block diagram of an example of a congestion control system according to a first embodiment.

As shown in FIG. 1, a communication system according to a first embodiment includes a terminal 102 for requesting synchronization of data by a communication protocol (for example, SyncML) for performing data synchronization, a synchronization server 104 for synchronizing the data to the terminal 102 by the communication protocol, and a repeater 100 for relaying the data on network communication paths 140, 142 between the repeater 100 and the respective terminal 102 and the synchronization server 104. The communication system may include a plurality of repeaters 100, terminals 102, and synchronization servers 104.

As shown in FIG. 1, the repeater 100 includes a network interface 110 that can receive requests from the terminal 102 and transmit responses, a network interface 112 that can transmit requests to the synchronization server 104 and receive responses from the synchronization server 104, and a traffic repeater 114 for relaying requests and responses.

A request management information storage unit 130 stores information about a request into request management information D80 when the coupling with the terminal 102 is established.

A server state management unit 122 measures the processing capacity of the synchronization server 104. More specifically, for example, the server state management unit 122 measures the response time from the synchronization server 104 for the relayed request, and obtains the average response time for each combination of the destination of the synchronization server 104 and the database to be synchronized. The average response time for each combination is stored as destination management information D20 by a destination management information storage unit 134. Further, the server state management unit 122 determines the state of the request based on the content of the response from the synchronization server 104. Then, the server state management unit 122 obtains the average response time for each state of the request. The average response time for each state is stored as state management information D40 by a state management information storage unit 132.

A next load level determination/response change unit 124 analyzes the response of the synchronization server 104, and determines the next state of the request for the response, based on the content of the analysis as well as a state transition table D60. Further, the next load level determination/response change unit 124 estimates, for each synchronization server 104, the load level of the next state of the request from the terminal 102 to be placed on the synchronization server 104, based on the next state of the request, the state management information D40, and the destination management information D20.

Then, the next load level determination/response change unit 124 adds the information including the estimated load level, to the response from the synchronization server 104. Note that when receiving the response including the load information, the terminal 102 transmits the next request including the load information.

A load information analysis/change unit 116 obtains the load information included in the request from the terminal 102, and analyzes the obtained load information.

In order to eliminate illegal operation against the regulation, such as alternation of the load information, an encryption/decryption unit 118 may be provided to encrypt the load information and add the encrypted load information to the response. It is possible to use a common key or public key as the encryption algorithm, which can be shared or obtained by a known method. When the obtained load information is encrypted, the load information analysis/change unit 116 analyzes the load information after decryption by the encryption/decryption unit 118.

A request regulation determination/response unit 120 determines whether or not to regulate the request, based on the analyzed content of the load information as well as the destination management information D20. When the request is rejected without being relayed, the request regulation determination/response unit 120 returns a message notifying that the request is not relayed as a response to the terminal 102.

Figures 2, 3:
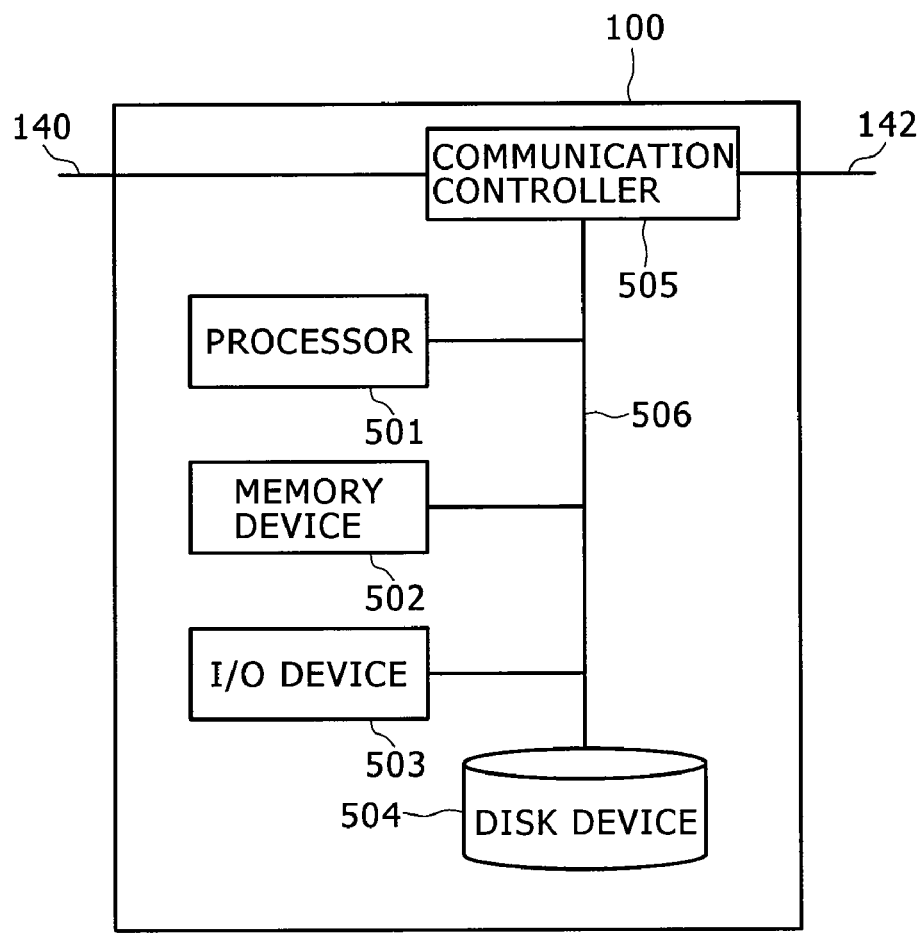
FIG. 2 is a block diagram of an example of an information processing system used as the congestion control system according to the first embodiment.
FIG. 3 is a block diagram of an example of request management information stored in a storage unit according to the first embodiment.

FIG. 2 is a diagram showing the physical configuration of an electronic computer realizing the repeater 100 according to the first embodiment. The repeater 100 of this embodiment includes a processor 501 for executing a program to realize the process described below, a memory device 502 for reading and temporarily storing the program to be executed and data, an input device 503 for inputting instructions and information from the outside of the repeater 100, a disk device 504 used as a storage means of data such as the substance of the program, the instructions, and the information, a communication controller 505 for controlling data communication between inside and outside of the repeater 100, an internal communication line 506 such as a bus for communicating data within the repeater 100, and an external communication line 507 for communicating data between the inside of the repeater 100 and the external device.

The processor 501 executes the program stored in the disk device 504, realizing each of the process units of the repeater 100 in FIG. 1 in association with the necessary devices, respectively.

The above program may be stored in advance in the memory device 501 or the disk device 504 within the repeater 100, or may be installed from a removable storage medium that the repeater 100 can use, or installed from another device through a communication medium (the networks 140 and 142, or a carrier or digital signal propagating on the networks), according to the necessity.

FIG. 3 is an example of the request management information D80 stored by the request management information storage unit 130 when the repeater 100 of this embodiment establishes the connection with the terminal 102. The request management information D80 has items including a state D82 of the request, a destination number D84 for identifying the synchronization server 104, which is the destination of the request, as well as the database, a load level D86 indicating the level of the load of the state of the request to be placed on the synchronization server 104, and a request transmission time D88 at which the repeater 100 transmits the request received from the terminal 102 to the synchronization server 104.

FIG. 4 is an example of the destination management information D20 in which the destination management information storage unit 134 stores the average response time for each combination of the synchronization server 104 and a database. The destination management information D20 has items including a destination server D22 indicating the destination address of the synchronization server 104, a destination database D24 indicating the database to be synchronized, a destination number D26 that is the unique number given to the combination of the destination server D22 and the destination database D24, and an average response time D28 that is the average of the response time from the synchronization server 104 for each number of the destination number D26.

FIG. 5 is an example of the state management information D40 in which the state management information storage unit 132 stores the average response time of the synchronization server 104 for the request of each state. The state management information D40 has items including a state name D42 indicating the state of the request, an average response time D44 that is the average of the response time from the synchronization server 104 for each state, and an adjustment parameter D46 for manual prioritization of each state.

Figure 13:
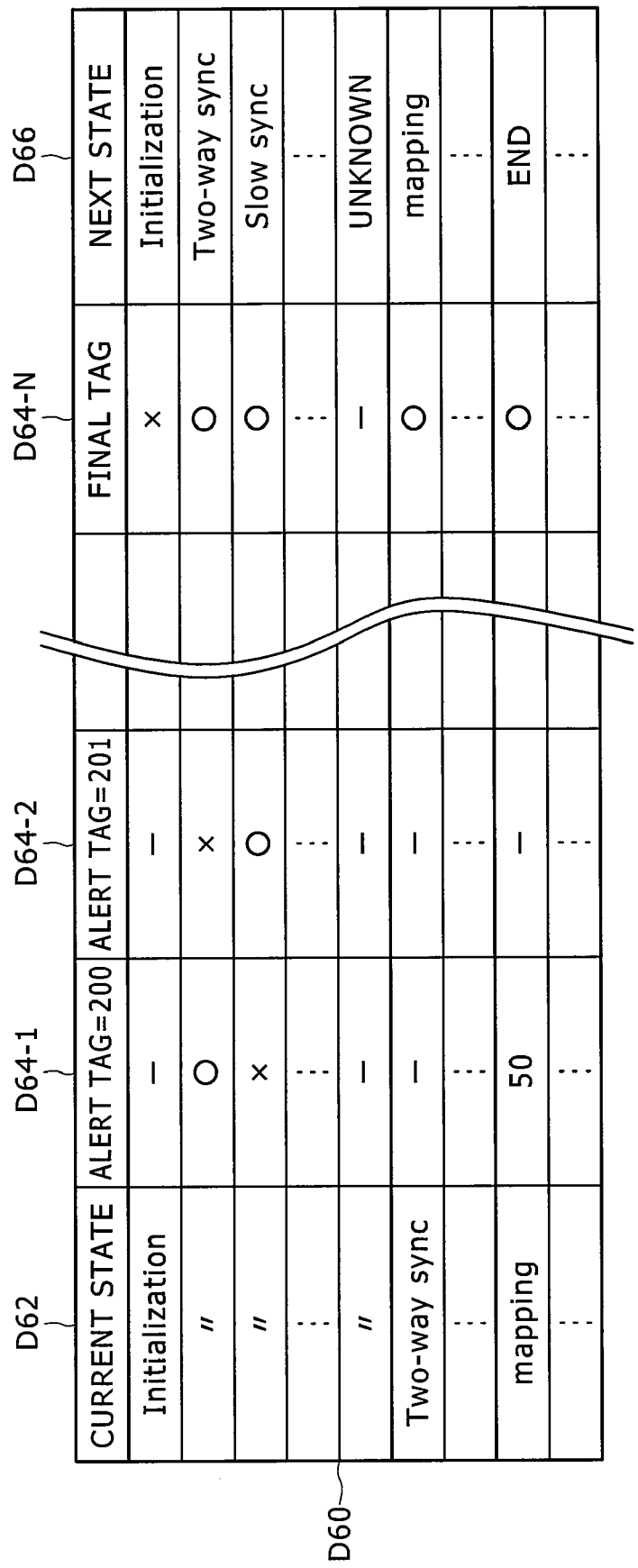
FIG. 13 is a block diagram of an example of a state transition table stored in a storage unit according to the first embodiment.

FIG. 13 is an example of the state transition table D60 used by the next load level determination/response change unit 124 to determine the next state of the request, based on the current state as well as the values of specific tags included in the response. The state transition table D60 has items including a current state D62, conditions D64-N of the specific tags included in the response, and a next state D66 of the request.

FIG. 6 is an example of a request M100 that the terminal 102 transmits to the synchronization server 104 by using SyncML/HTTP (Hyper Text Transfer Protocol) as a communication protocol for data synchronization. The request M100 has a request URI (M102).

FIG. 7 is an example of a response M200 that the synchronization server 104 transmits in response to the request of the terminal 102 by using SyncML/HTTP as the communication protocol for data synchronization. The response M200 has items including a sequence number M202 of the response, an address M204 of the synchronization server 104, an address M206 of the database to be synchronized, and an address (hereinafter referred to as a response URI) M208 that the terminal 102 will use for the request URI in the next request.

Figure 8:
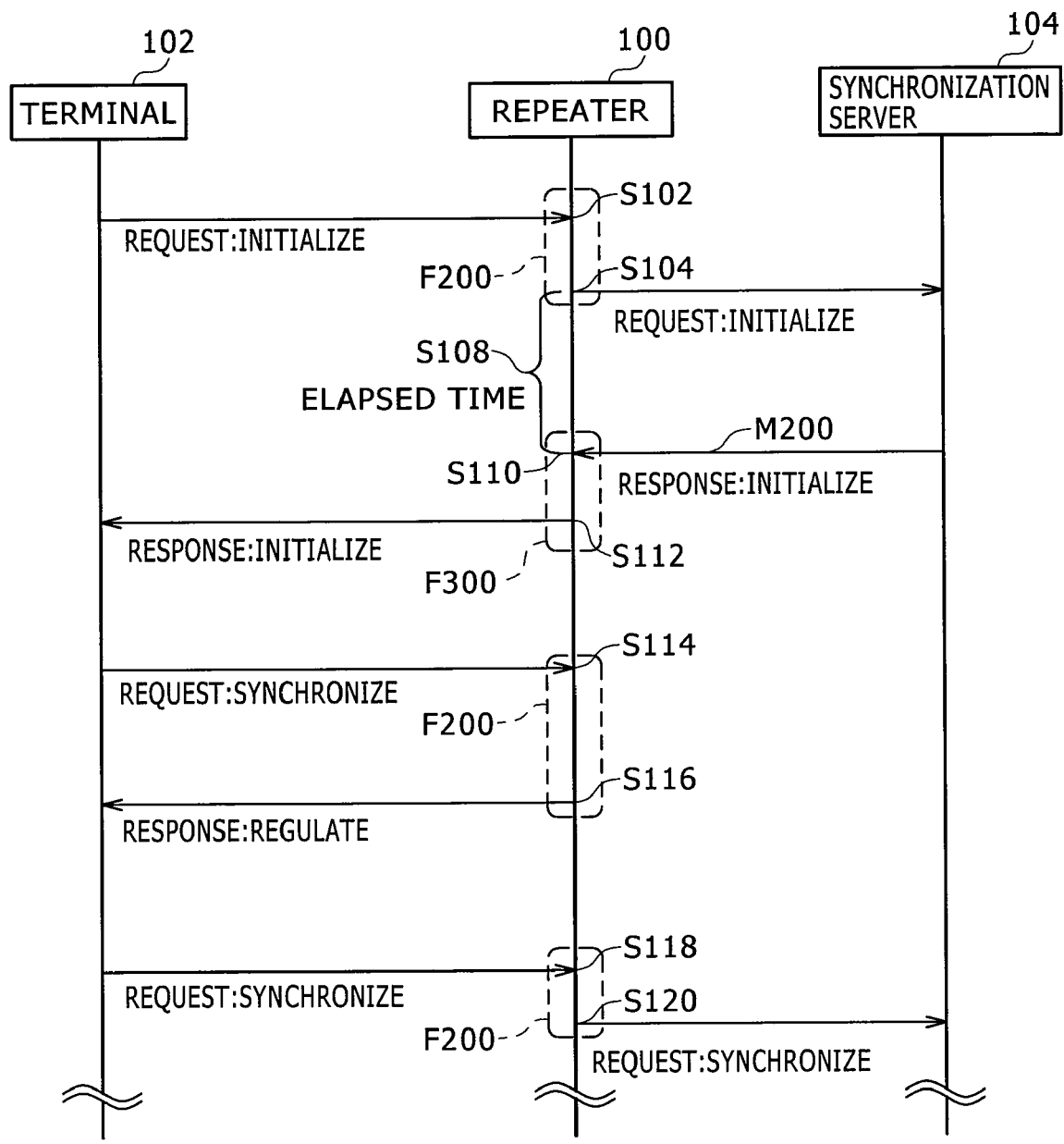
FIG. 8 is a schematic diagram of an example of a communication sequence among the terminal, the repeater, and the synchronization server, according to the first embodiment.

FIG. 8 is an example of the communication sequence in the first embodiment.

First, the terminal 102 transmits a request for initialization process for data synchronization, and the network interface 110 of the repeater 100 receives the request (S102). By process F200, which will be described later, the repeater 100 stores the current time into the request transmission time D88 of the request management information D80, and transmits the request to the synchronization server 104 (S104). The synchronization server 104 transmits the response (M200) for the initialization request (S100). Then, the network interface 112 of the repeater 100 receives the response (S110). By process F300, which will be described later, the repeater 100 obtains the elapsed time S108 from the difference between the time of receiving the response and the response transmission time D88. Then, the repeater 100 adds the information of the destination management information D20, based on the address M204 of the synchronization server 104 as well as the database name M206 to be synchronized, which are included in the response M200, and on the elapsed time S108.

Further, the next load level determination/response change unit 124 of the repeater 100 determines the state of the next request based on the response M200 and the state transition table D60, and estimates the load level of the next request from the terminal 102, based on the determined state of the next request, the state management information D40, and the destination management information D20. Then, the next load level determination/response change unit 124 adds the load information as a parameter including the load level, the identification number for identifying the destination synchronization server 104 and the database, as well as the state of the next request, to the response URI (M208) included in the response from the synchronization server 104. Then, the next load level determination/response change unit 124 transmits the response to the terminal 102 (S112). The repeater 100 may also include the encryption/decryption unit 118 to encrypt the load information.

In each embodiment, the control of the repeater 100 is performed based on the load information included in the request from the terminal. For this reason, each process unit does not necessarily know whether different states of a plurality of requests received from the terminal constitute a single request, or are included in different requests.

The terminal 102 transmits the value of the response URI (M208) of the response M200 to the request M100 by using the request URI (M102). Then, the network interface 110 of the repeater 100 receives the request M100 (S114). By process F200, which will be described later, the repeater 100 decrypts the encrypted load information included in the request URI (M102), determines whether or not to relay the request to the terminal 102 based on the load level of the request as well as the average response time from the destination of the request. When the request is rejected without being relayed, the repeater 100 returns a message (regulation message) indicating that the request is not relayed, as a response to the terminal 102 (S116). Upon receiving the regulation message, the terminal 102 suspends the communication, but can later resume the communication from the last point.

When the terminal 102 transmits again the request M100, the network interface 110 of the repeater 100 receives the request (S118). By process F200, which will be described later, when it is determined to relay the request to the synchronization server 104 based on the load level of the request as well as the average response time from the destination of the request, the load information analysis/change unit 116 of the repeater 100 removes the load information included in the request URI (M102) of the request, and then relays the request to the synchronization server 104 (S120).

Figure 9:
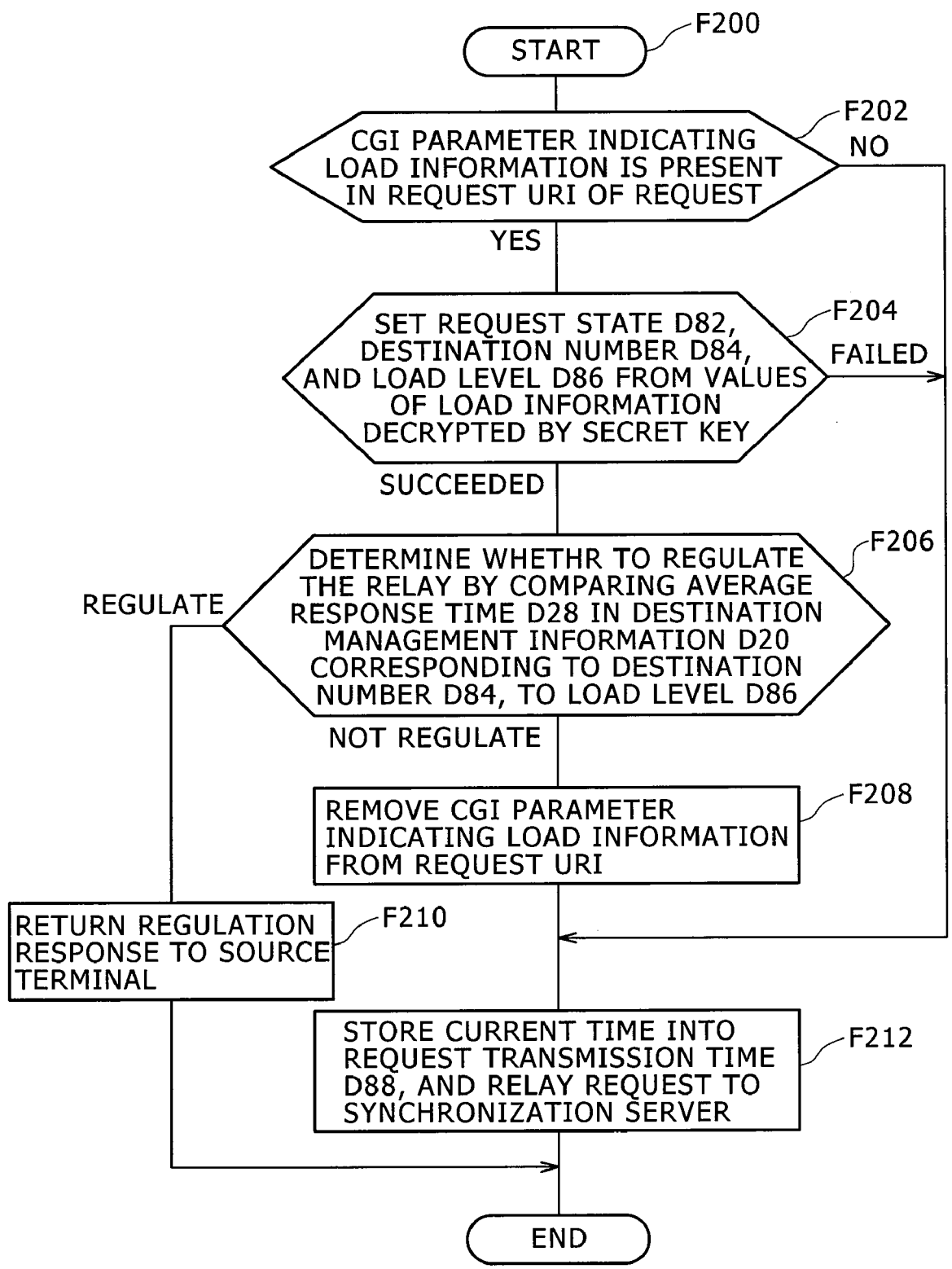
FIG. 9 is a flowchart of an example of the procedure to process the request received from the terminal by the congestion control system according to the first embodiment.

FIG. 9 is a flowchart of the detailed operation of the repeater 100 when the network interface 110 of the repeater 100 receives a request from the terminal 102, which corresponds to F200 in FIG. 8. When the network interface 110 receives a request from the terminal 102 (F200), the load information analysis/change unit 116 determines whether the load information is present in the request URI (M102) of the request (F202). When the load information is not present, the repeater 100 stores the current time into the request transmission time D88, and relays the request to the synchronization server 104 (F212). When the load information is present, the repeater 100 decrypts the load information by a secret key. The decrypted load information includes the values of the load level, the destination number, and the state. The request management information storage unit 130 sets the respective values to the load level D86, the destination number D84, and the request state D82 in the request management information D80 (F204). Note that the load information may include a plurality of destination numbers. In this case, the request management information storage unit 130 sets a plurality of destination numbers D84.

The request regulation determination/response unit 120 compares the average response time D28 in the destination management information D20 that corresponds to the destination number D26 of the same value of the destination number D84, to the load level D86. Then, the request regulation determination/response unit 120 determines whether or not to regulate the request (F206). The following is an example of the equation for the comparison, where $\alpha$, $\beta$, $\gamma$ are predetermined constants as the parameters.

$$(\text{Load level } D86) \times \alpha + (\text{Average response time } D28) \times \beta < \gamma \qquad \text{(Equation 1)}$$

When a plurality of destination numbers D26 are present, the average response time D28 of the maximum value of the destination numbers D26 is used. When the result of Equation 1 is false, like S116, the repeater 100 rejects the request from the terminal 102 without being relayed to the synchronization server 104, and returns a message indicating that the request is not relayed as a response to the terminal 102 which is the source of the request (F210). When the result of Equation 1 is true, like S120, the repeater 100 removes the load information from the request URI (M102) of the request (F208), stores the current time into the request transmission time D88, and relays the request to the synchronization server 104 (F212).

Figure 10:
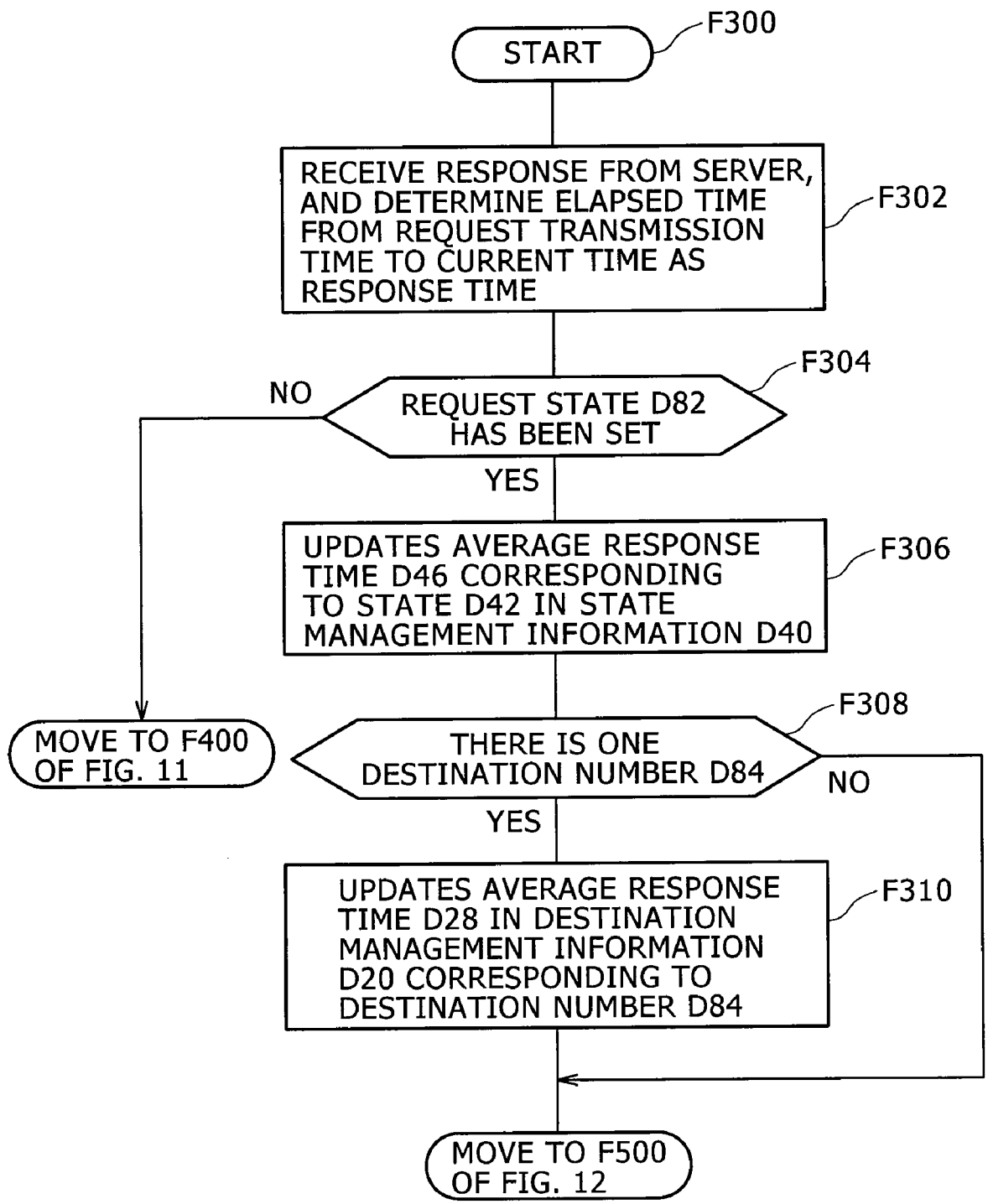
FIG. 10 is a flowchart of an example of the procedure to process the response from received the server device by the congestion control system according to the first embodiment.
Figure 11:
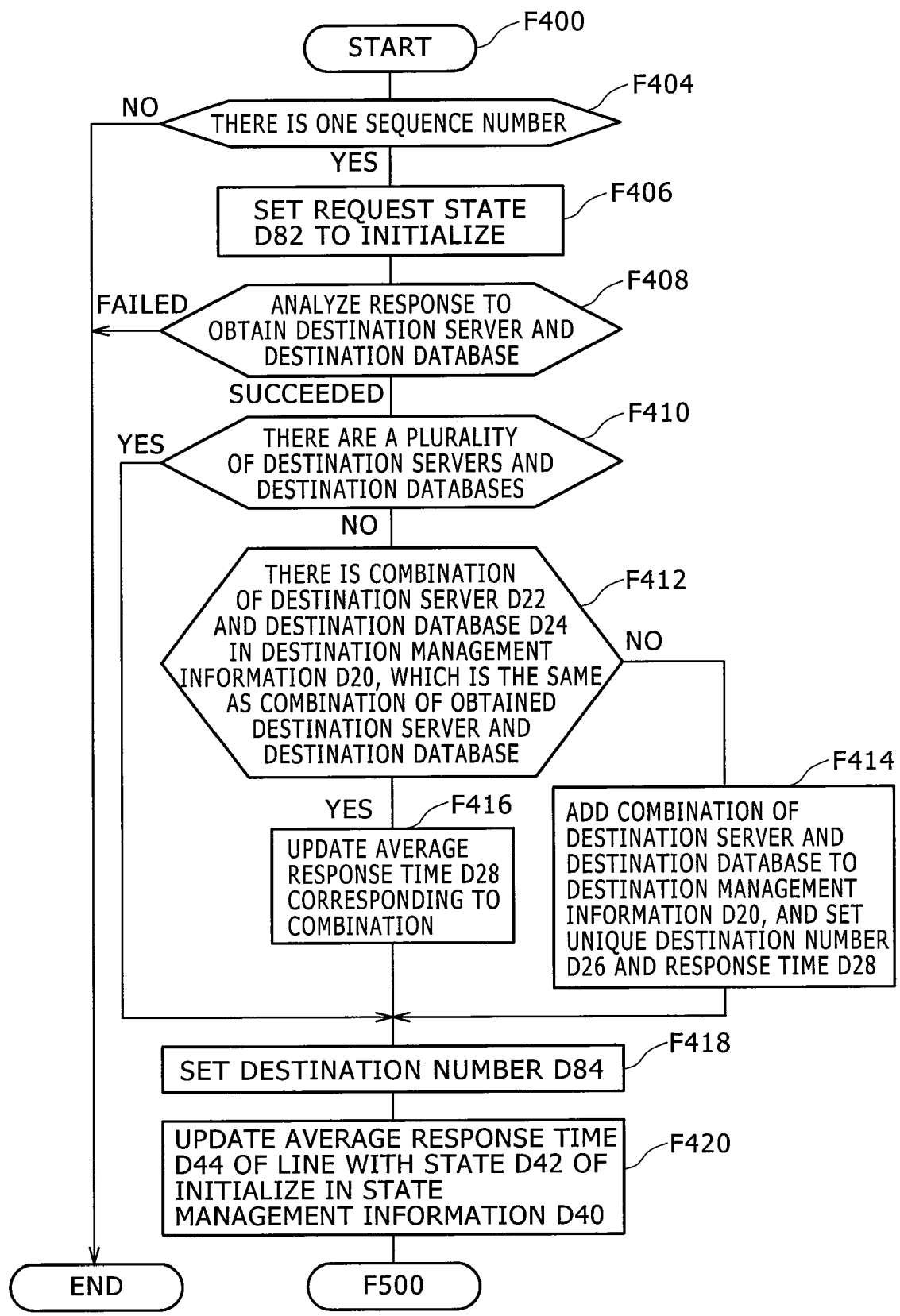
FIG. 11 is a flowchart continued from FIG. 10, showing an example of the procedure to process the response received from the server device by the congestion control system according to the first embodiment.
Figure 12:
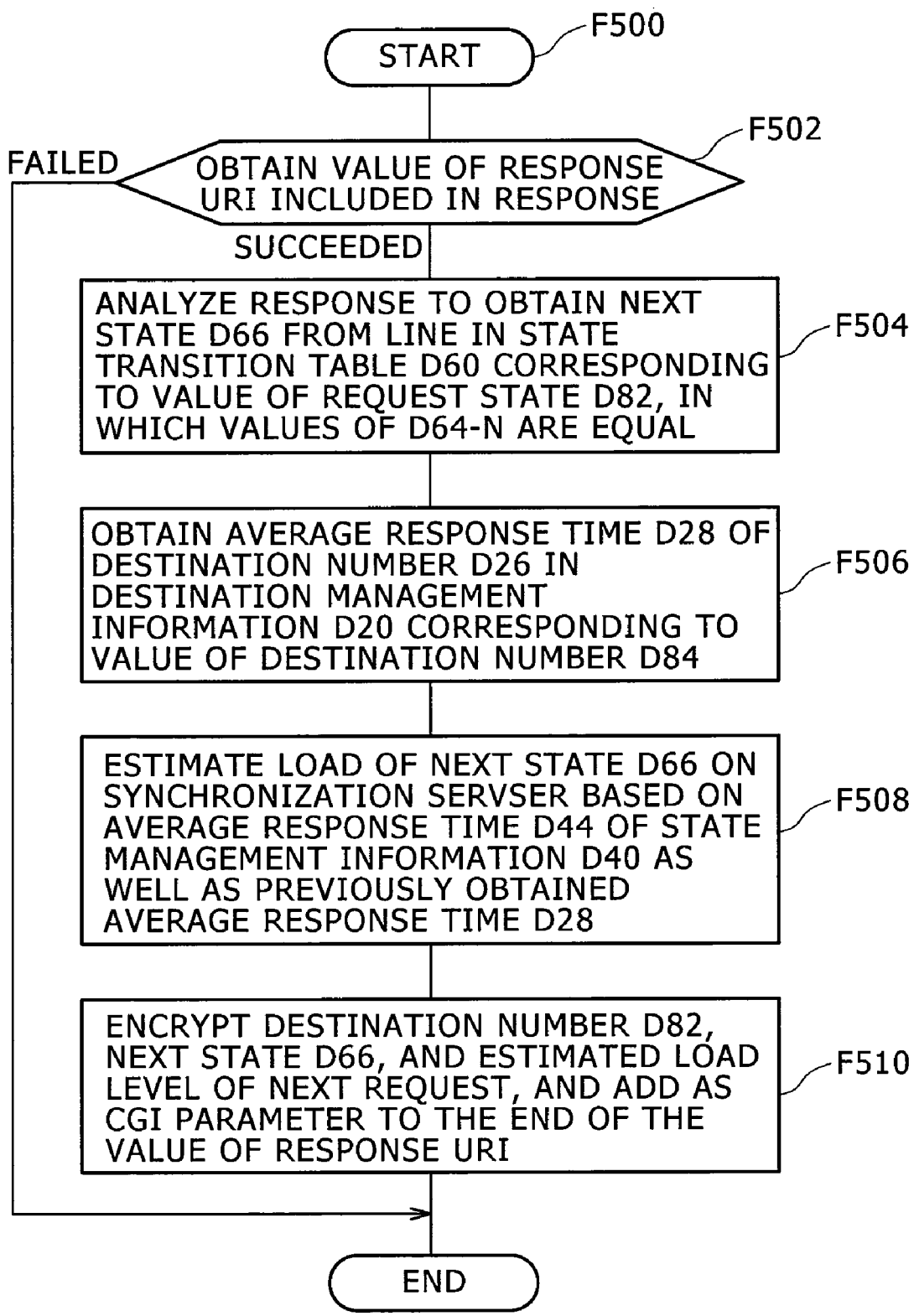
FIG. 12 is a flowchart of an example of the procedure to add the load information to the response of the server device by the congestion control system according to the first embodiment.

FIGS. 10, 11, 12 are flowcharts showing the detailed operation of the repeater 100 when the network interface 112 receives the response from the synchronization server 104, which corresponds to F300 in FIG. 8.

When the network interface 112 receives a response from the synchronization server 104 (F300), the server state management unit 122 measures the elapsed time from the request transmission time D88 to the current time, as the response time (F302). Next, the server state management unit 122 determines whether the request state D82 has been set in F204 (F304). When the request state D82 has been set in F204, the server state management unit 122 performs the following process.

First, the server state management unit 122 updates the average response time of the state name D42 in the state management information D40 that corresponds to the same value of the request state D82 (F306). Then, the server state management unit 122 determines whether a plurality of destination number D84 exist (F308). When there is only one destination number D84, the server state management unit 122 updates the average response time of the destination number D26 in the destination management information D20 that corresponds to the same value of the destination number D84.

When the request state D82 is not set in F304, the server state management unit 122 analyzes the response M200 from the server, obtains the sequence number (M202), and determines whether the value of the obtained sequence number (M202) is 1 (F404 in FIG. 11). When the value is 1, the server state management unit 122 sets the request state D82 to "Initialize" (F406). Then, the server state management unit 122 analyzes the response M200, and obtains the destination server (M204) as well as the destination database (M206) (F408). When the server state management unit 122 obtains one combination of the destination server (M204) and the destination database (M206) (F410), which is the same as a combination of the destination server D22 and the destination database D24 in the destination management information D20 (F412), the server state management unit 122 updates the average response time D28 corresponding to the same combination. When the same combination is not present in the destination management information D20, the server state management unit 122 adds the combination of the destination server (M204) and the destination database (M206) to the destination management information D20, and sets the unique values of the destination number D26 and the average response time D28 (F414).

Next, the server state management unit 122 sets the destination number D26 corresponding to the combination of the destination server (M204) and the destination database (M206), to the destination number D84 of the request management information D80 (F418). Then, the server state management unit 122 updates the average response time D44 corresponding to the state name D42 of "Initialize" in the state management information D40 (F420).

When the process from F300 normally ends (F310), the next load level determination/response change unit 124 obtains the response URI (M208) included in the response (F502 in FIG. 12). Then, the next load level determination/response change unit 124 determines the line of the state transition table D60 with the current state D62 of the same value of the request state D82, in which Alert tag code (M210) and Final tag code (M212) are both present or absent. In this way, the next load level determination/response change unit 124 determines the next state D66 (F504).

Further, the next load level determination/response change unit 124 obtains the average response time D28 in the destination management information D20 that corresponds to the destination number D26 of the same value of the destination number D84 (F506). Then, the next load level determination/response change unit 124 estimates the load level of the next request from the terminal 102, based on the average response time D44 and the adjustment parameter D46 in the state management information D40 that correspond to the state D42 of the same value of the next state D66, as well as the average response time D28 obtained in F506 (F508). When a plurality of destination numbers D84 are present, the average response time D28 of the maximum value of the destination numbers D84 is used. The following is an example of the equation for estimating the load level, where $\alpha$, $\beta$, $\gamma$ are predetermined constants as the parameters. The value of each constant may be different from that of Equation 1.

(Load level)=(Average response time $D44$)×$\alpha$+(Adjustment parameter $D46$)×$\beta$+(Average response time $D28$)×$\gamma$ (Equation 2)

The next load level determination/response change unit 124 encrypts the obtained load level, the destination number D84, and the next state D66 by the encryption/decryption unit 118 to generate the load information. Then, the next load level determination/response change unit 124 adds the generated load information, as the CGI parameter, to the value of the response URI (M208) obtained in F502 (F510). However, as described above, the encryption is not necessarily performed.

As described above, according to this embodiment, it is possible to provide a congestion control function of estimating the load level of the next request from the terminal 102 to be placed on the process of the synchronization server 104 based on the response of the synchronization server 104 for the request from the terminal 102, and responding to the terminal 102 with the estimation result as load information, in order to control the request based on the load information included in the next request from the terminal 102.

Second Embodiment

A second embodiment is featured in that when the relay of a request from the terminal 102 is regulated because of the load level included in the request from the terminal 102, the congestion control system, that is the repeater 100, reduces the load level of the next request from the terminal 102.

Figure 14:
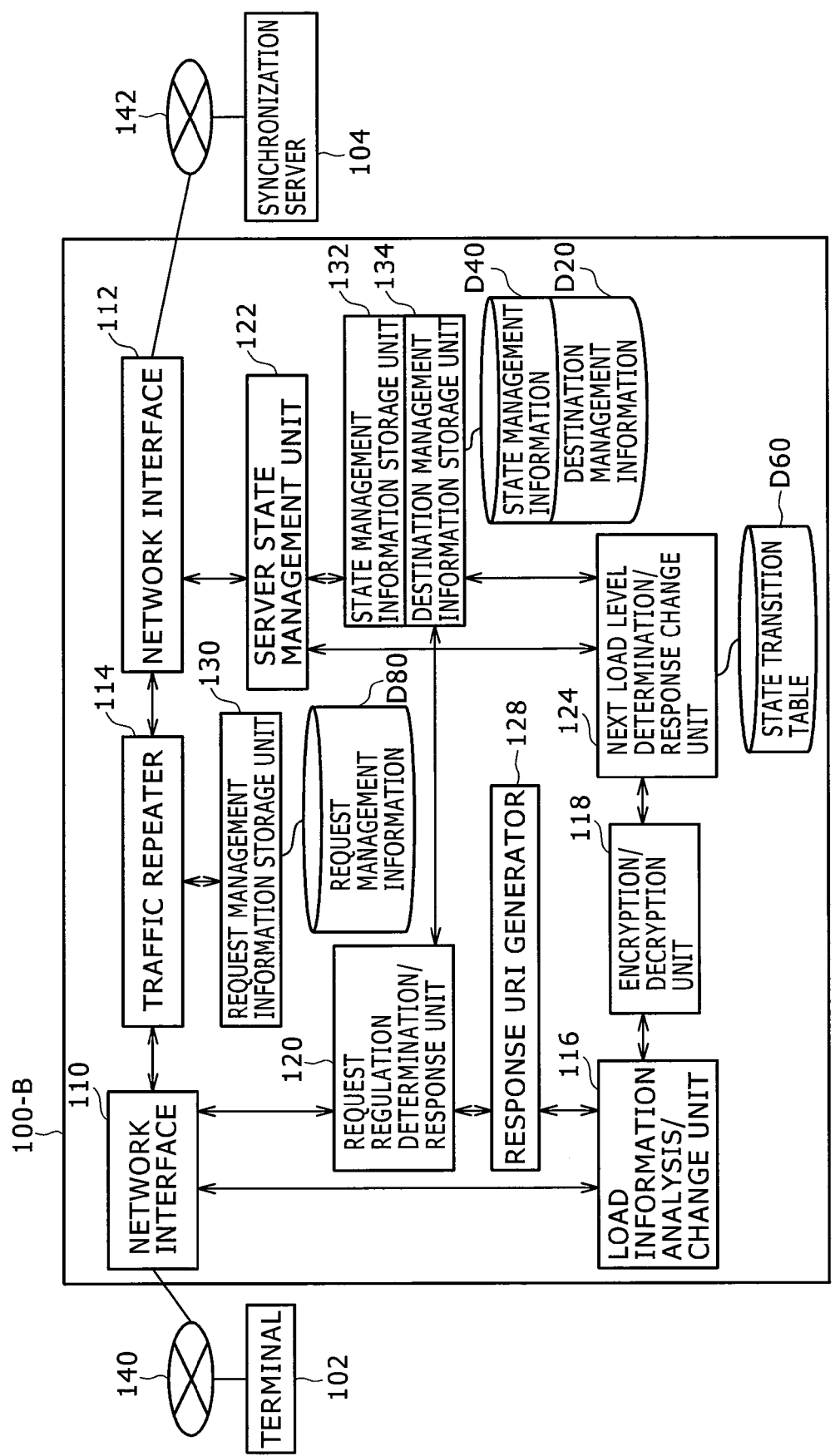
FIG. 14 is a block diagram of an example of a congestion control system according to a second embodiment.

FIG. 14 is a block diagram of an example of a communication system according to the second embodiment. A repeater 100-B includes a response URI generator 128 for generating a response URI used for the request URI of the next request from the terminal 102. The other configurations of the repeater 100-B of the second embodiment can be the same as the configuration of the repeater 100 of the first embodiment. The second embodiment is the same as the first embodiment in that the processor 501 executes a program to realize each of the process units of the repeater 100-B in association with the necessary devices, respectively.

The flowchart of the second embodiment showing the detailed operation of the repeater 100-B when receiving a request from the terminal 102, is different from the flowchart of FIG. 9 of the first embodiment in the following point. That is, when the repeater 100-B rejects the request without being relayed in F206 and returns a message indicating that the request is not relayed as a response to the terminal 102, the response URI generator 128 generates a response URI with a load level lower than the load level included in the current request, and returns a response including the response URI to the terminal 102, instead of performing F210. The terminal 102 uses the value of the received response URI with the reduced load level for the request URI of the request to be transmitted next time. The other processes from F200 to F500 of the flowchart are the same as the processes of the first embodiment.

The following is the procedure that the response URI generator 128 generates the response URI (M302) with the reduced load level. First, the response URI generator 128 reduces the load level D86 by a predetermined rate or a predetermined value. Next, the encryption/decryption unit 118 encrypts the request state D82, the destination number D84, and the load level D86 by a secret key to generate the load information. Then, the portion of the load information included in the request URI of the request is replaced with the newly generated load information as the value of the response URI. However, as described above, the encryption is not necessarily performed.

FIG. 15 is an example of the response (M300) returned to the terminal 102 by the repeater 100-B in F216 according to the second embodiment. The response (M300) includes the response URI (M302).

As described above, according to this embodiment, when it is determined not to relay the request from the terminal 102, the repeater 100-B returns a regulation response including the response URI with the reduced load level to the terminal 102, in order to reduce the load level included in the next request from the terminal 102. In other words, the load level of the request from the terminal 102 that is rejected to be relayed has the load level lower than the previous request. Thus, it is possible to provide a congestion control function of preferentially excluding the request from the terminal 102 with the lower load level from the regulation.

Third Embodiment

A third embodiment is featured in that an HTTP cookie is used for the exchange of the load information between the terminal 102 and the congestion control system, that is the repeater 100, to regulate the request relay based on the load information with the HTTP cookie.

Figure 16:
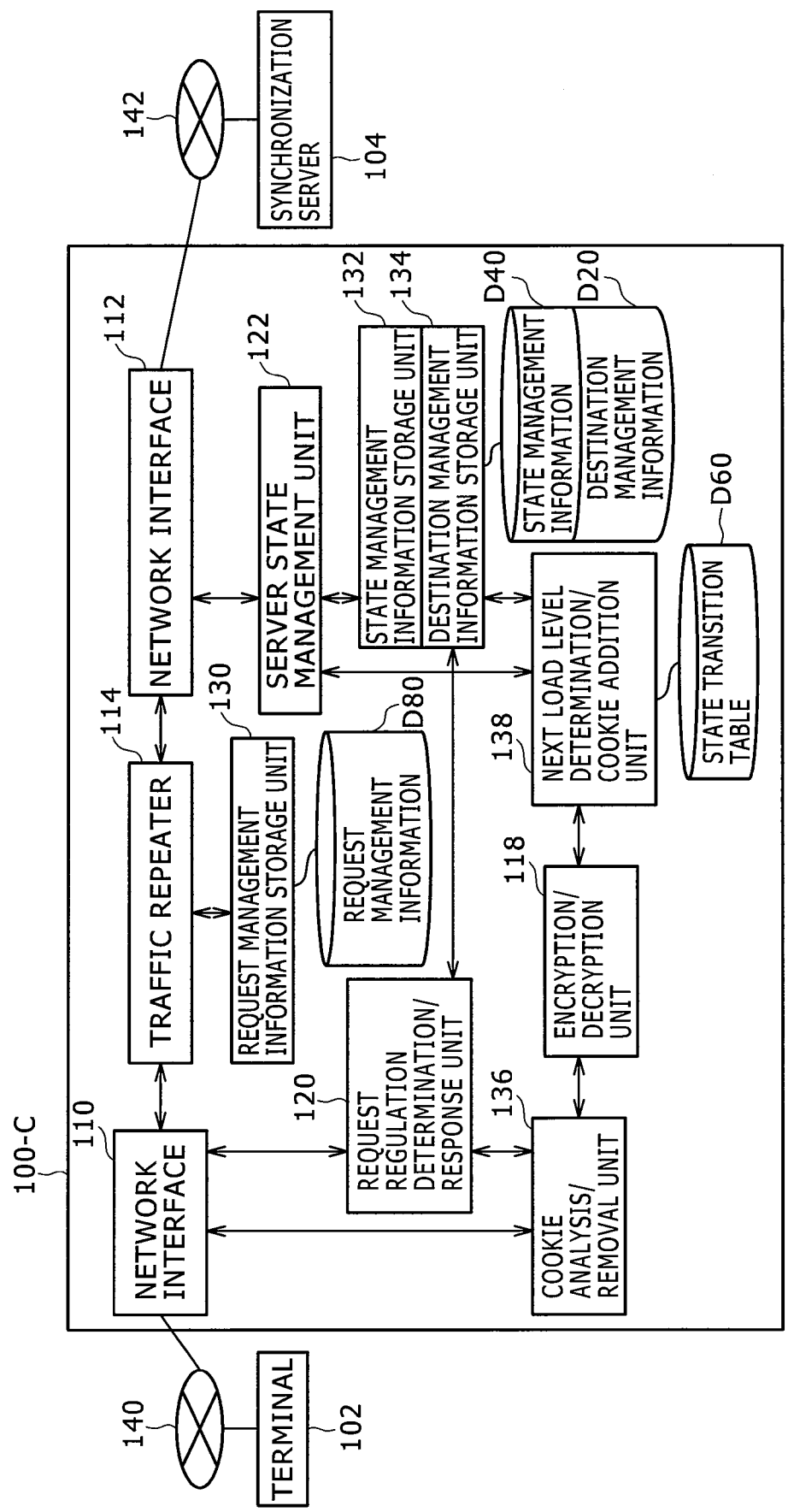
FIG. 16 is a block diagram of an example of a congestion control system according to a third embodiment.

FIG. 16 is a block diagram of an example of a communication system according to the third embodiment. A repeater 100-C includes a cookie analysis/removal unit for analyzing and removing the HTTP header field "Cookie" included in the request from the terminal 102. The repeater 100-C also includes a next load level determination/cookie addition unit 138 for estimating the load level of the next request, and for adding the information about the load level as the HTTP header field "Set-Cookie", to the response from the synchronization server 104. The other configurations of the repeater 100-C of the third embodiment can be the same as the configurations of the repeater 100 of the first embodiment. Also, the third embodiment is the same as the first embodiment in that the processor 501 executes a program to realize each of the process units of the repeater 100-B in association with the necessary devices, respectively.

FIG. 17 is an example of the third embodiment, showing a response (M400) transmitted to the terminal 102 together with the load information added to the response from the synchronization server 104 by the repeater 100-C, as well as a request (M500) transmitted by the terminal 102 in response to the response of the synchronization server 104. The response (M400) has a "Set-Cookie" header field (M402) in which the load information is described. The request (M500) has a "Cookie" header field (M502) in which the load information is described.

The flowchart of the third embodiment showing the detailed operation of the repeater 100-C when receiving a request from the terminal 102, is different from the flowchart of FIG. 9 of the first embodiment in the following point. That is, when the network interface 110 receives a request from the terminal 102 (F200), the cookie analysis/removal unit 136 determines whether the load information is present in the cookie header field (M502) of the HTTP, instead of performing F202. Further, when it is determined not to regulate the request in F206, the cookie analysis/removal unit 136 removes the "Cookie" header filed including the load information, instead of performing F208. The other processes of the third embodiment are the same as the processes of the first embodiment.

The flowchart of the third embodiment showing the detailed operation of the repeater 100-C when receiving a response from the synchronization server 104, determining the load level of the next request by the next load level determination/cookie addition unit 138, and adding the cookie to the response from the synchronization server 104, is different from the flowchart of FIG. 12 of the first embodiment in the following point. That is, in the third embodiment, the next load level determination/cookie addition unit 138 adds the estimated load level, as the "Set-Cookie" header field (M502) of the HTTP, to the response from the synchronization server 104, instead of performing F508. The other processes of the third embodiment are the same as the processes of the first embodiment.

As described above, according to this embodiment, the repeater 100-C adds the load level of the next request is added as HTTP cookie to the response of the synchronization server 104. Thus, it is possible to provide a congestion control function of regulating the relay of the request based on the load information of the HTTP cookie included in the request from the terminal 102.

Further, the third embodiment can be combined with the second embodiment.

Fourth Embodiment

A fourth embodiment is featured in that the congestion control system, that is the repeater 100, temporarily delays the relay of a request from the terminal 102 to the server device based on the value of the load information included in the request. Note that in the fourth embodiment, the relay of the request is not rejected, so that no regulation response is returned.

Figure 18:
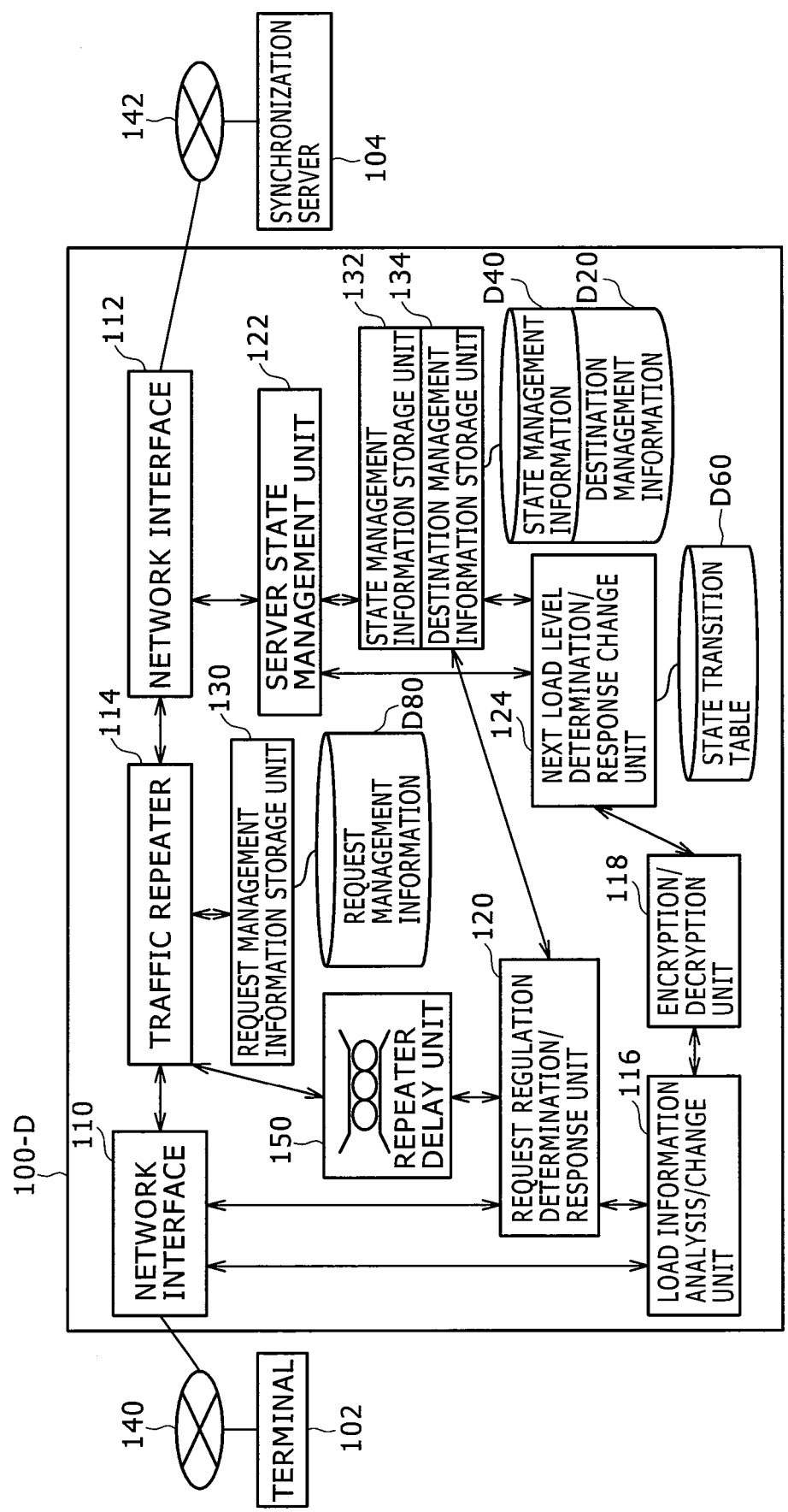
FIG. 18 is a block diagram of an example of a congestion control system according to a fourth embodiment.

FIG. 18 is a block diagram of an example of a communication system according to the fourth embodiment. A repeater 100-D includes a repeater delay unit 150 for temporarily suspending the request relay to the synchronization server 104. The other configurations of the repeater 100-D of the fourth embodiment can be the same as the configurations of the repeater 100 of the first embodiment. Also, the fourth embodiment is the same as the first embodiment in that the processor 501 executes a program to realize each of the process units of the repeater 100-D in association with the necessary devices, respectively.

The flowchart of the fourth embodiment showing the detailed operation of the repeater 100-D when receiving a request from the terminal 102, is different from the flowchart in FIG. 9 of the first embodiment in the following point. That is, in the fourth embodiment, the request regulation determination/response unit 120 obtains the value γ, based on the average response time D28 in the destination management information D20 that corresponds to the address number D26 of the same value of the value of the address number D84, as well as the load level D86, instead of performing F206. The following is an example of the equation for obtaining the value of γ, where α, β are predetermined constants as the parameters. The value of each of the constants may be different from that of Equations 1 and 2.

$$\gamma = (\text{Load level } D86) \times \alpha + (\text{Average response time } D28) \times \beta \quad \text{(Equation 3)}$$

When the value γ is larger than a predetermined value (γ'), or (γ'<γ), the repeater 100-D returns a regulation response to the terminal 102 which is the source of the request (F210). When the value γ is less than αvalue (γ"), which is less than the predetermined value (γ'), or (γ<γ"), the repeater 100-D relays the request. In the other case of (γ"<γ<γ'), the repeater delay unit 150 temporarily suspends the relay of the request from the terminal 102. The other processes of the fourth embodiment are the same as the processes of the first embodiment. The time when the repeater delay unit 150 suspends the relay of the request from the terminal 102 may be a predetermined time, or may vary depending on the value of γ obtained from the load level D86 and the average response time D28.

As described above, according to this embodiment, the repeater 100-D avoids the concentration of requests in the synchronization server 104 by delaying the relay of the request to the synchronization server 104 based on the load information included in the request from the terminal 102. Thus, it is possible to provide a congestion control function of reducing the congestion in the synchronization server 104 with requests.

Further, the fourth embodiment can be combined with the third embodiment.

Fifth Embodiment

A fifth embodiment is featured in that the congestion state of the synchronization server 104, as well as the amount of the load of the message of each state to be placed on the process of the synchronization server 104, are not estimated from the response time of the synchronization server 104, but are obtained from the synchronization server 104 by communication with the synchronization server 104.

Figure 19:
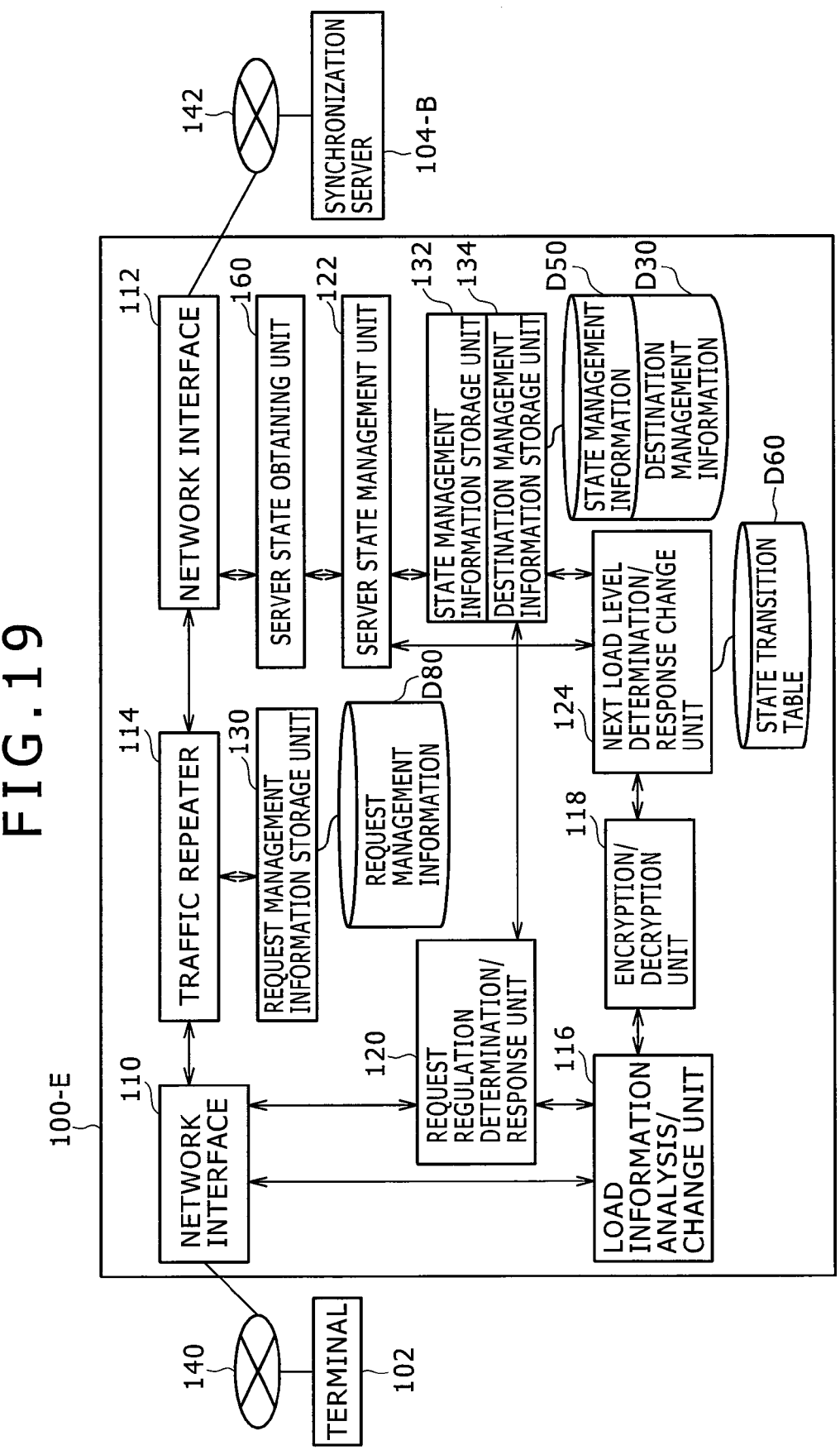
FIG. 19 is a block diagram of an example of a congestion control system according to a fifth embodiment.

FIG. 19 is a block diagram of an example of a communication system according to the fifth embodiment. A synchronization server 104-B has a function of measuring the processing capacity for each database, as well as the amount of the load of the message of each state to be placed on the process of the synchronization server 104-B, and delivering the information (hereinafter referred to as the congestion information) to a repeater 100-E through the communication path. The repeater 100-E includes a server state obtaining unit 160 for receiving the congestion information from the synchronization server 104-B through the communication path. For example, HTTP is used for the communication protocol between the server state obtaining unit 160 and the synchronization server 104-B. FIG. 20 is an example of an HTTP message M600 including the congestion information that the server state obtaining unit 160 obtains repeatedly (for example, periodically) from the synchronization server 104-B.

FIG. 21 is an example of state management information D50 stored by the state management information storage unit 132 of the fifth embodiment. In the state management information D50, the state management information storage unit 132 stores the load of the message of each state obtained from the synchronization server 104-B to be placed on the process of the synchronization server 104-B as the load state D52, instead of storing the average response time D44 in the state management information D40 of the first embodiment.

Figures 22, 23:
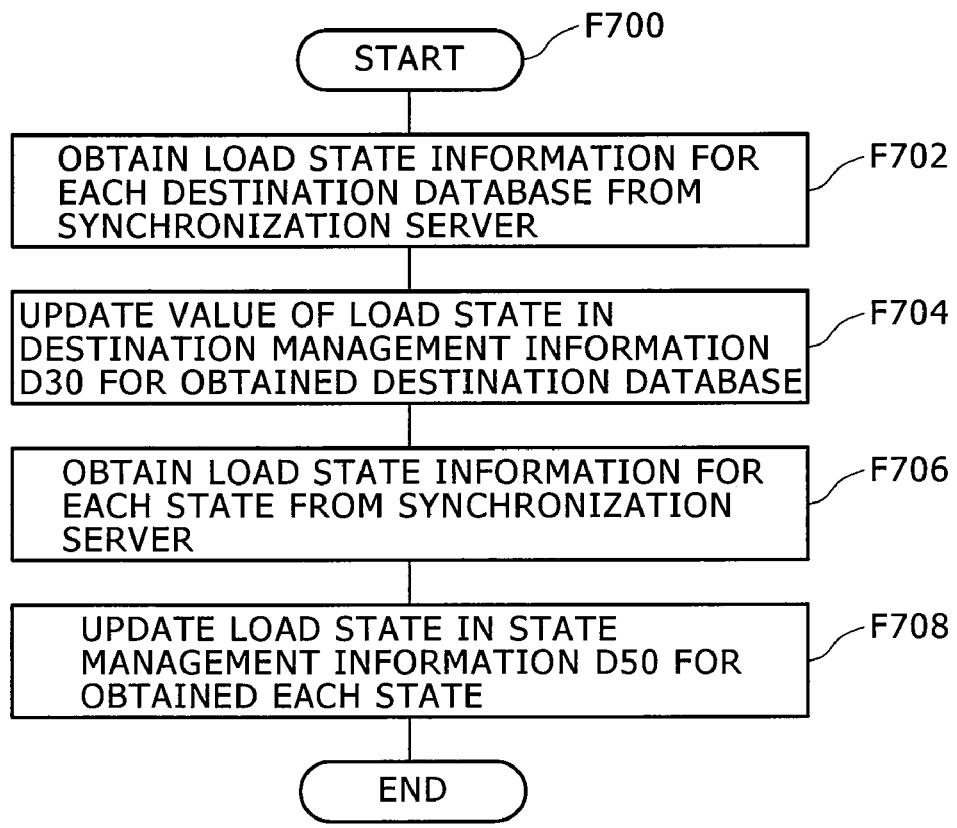
FIG. 22 is a block diagram of an example of state management information stored in a storage unit according to the fifth embodiment.
FIG. 23 is a flowchart of an example of the procedure to update the congestion information of the server device by the congestion control system according to the fifth embodiment.

FIG. 22 is an example of the destination management information D30 stored by the destination management information storage unit 134 of the fifth embodiment. In the destination management information D30, the destination management information storage unit 134 stores the processing capacity for each database obtained from the synchronization server 104-B as the load state D32, instead of storing the average response time D28 in the destination management information D30 of the first embodiment.

FIG. 23 is a flowchart of the procedure to update the values of the destination management information D30 and the state management information D50 repeatedly (for example, at predetermined time intervals) or upon notification from the synchronization server 104-B. First, the server state obtaining unit 160 obtains the load state information for each destination database of the synchronization server 104-B (F702). The information may be obtained by issuing a request from the server state obtaining unit 160 to the synchronization server 104-B, or may be delivered from the synchronization server 104-B in a push format. Next, the server state obtaining unit 160 updates the value of the load state D32 in the destination management information D30 that corresponds to the destination database D24 of the value of the obtained destination database (F704). Similarly, the server state obtaining unit 160 obtains the load state information for each state from the synchronization server 104-B (F706). Then, the server state obtaining unit 160 updates the value of the load state D52 in the state management information D50 that corresponds to the state name D42 of the value of the obtained state name (F708). Note that the load state for each destination database as well as the load state for each state can also be obtained by a single communication.

The flowchart of the fifth embodiment showing the detailed operation of the repeater 100-E when the network interface 110 receives a request from the terminal 102, is different from the flowchart of FIG. 9 of the first embodiment in the following point. That is, although the load level D86 and the average response time D28 are compared in F206 of FIG. 9 in the first embodiment, the load level D86 and the load state D32 are compared in the fifth embodiment. Further, the process of F212 of FIG. 9 in the first embodiment is not performed. The other processes of the fifth embodiment can be the same as the processes in FIG. 9 in the first embodiment. Also, the fifth embodiment is the same as the first embodiment in that the processor 501 executes a program to realize each of the process units of the repeater 100-E in association with the necessary devices, respectively.

Figure 24:
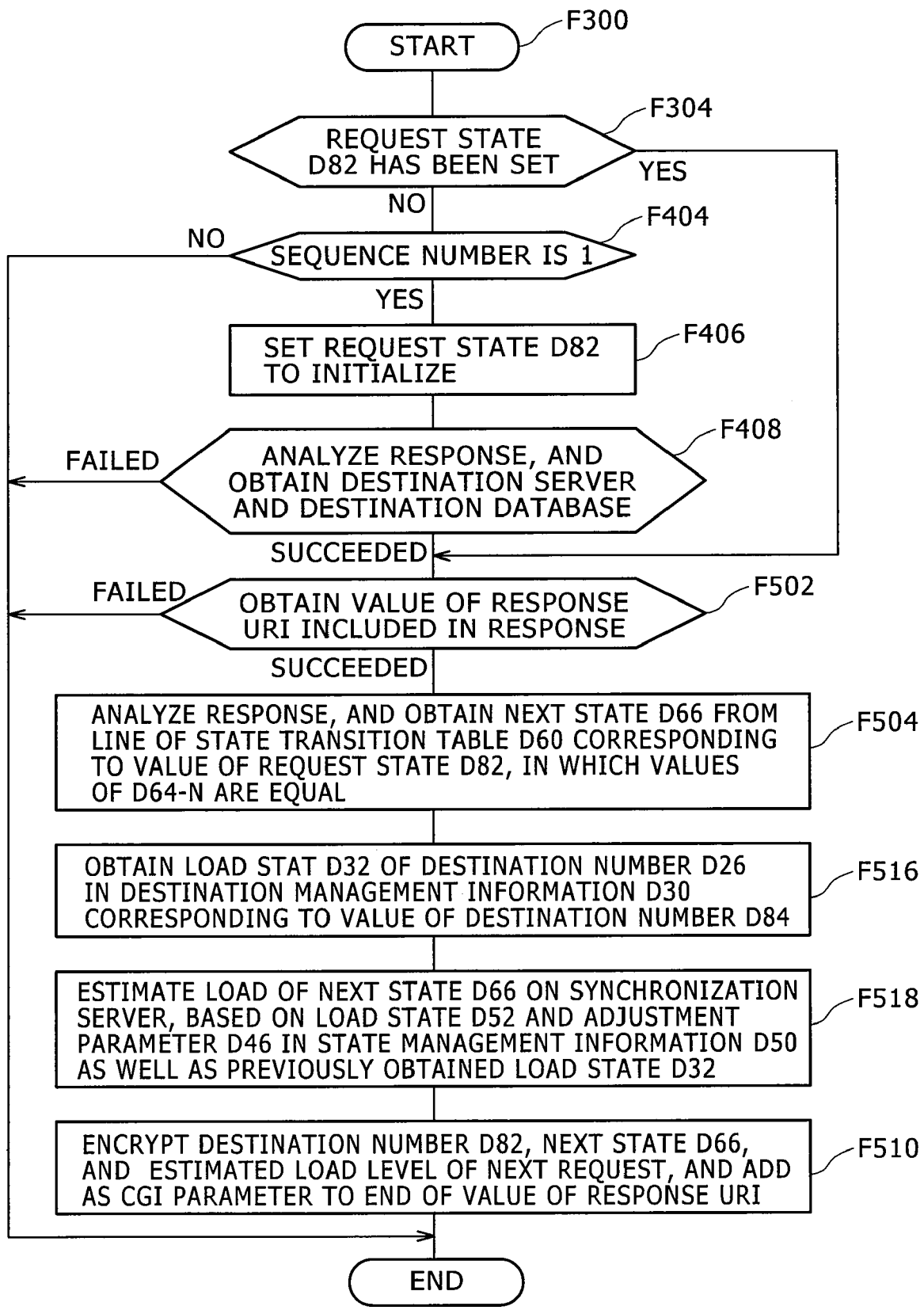
FIG. 24 is a flowchart of an example of the procedure to process the response received from the server device by the congestion control system according to the fifth embodiment.
Figure 25:
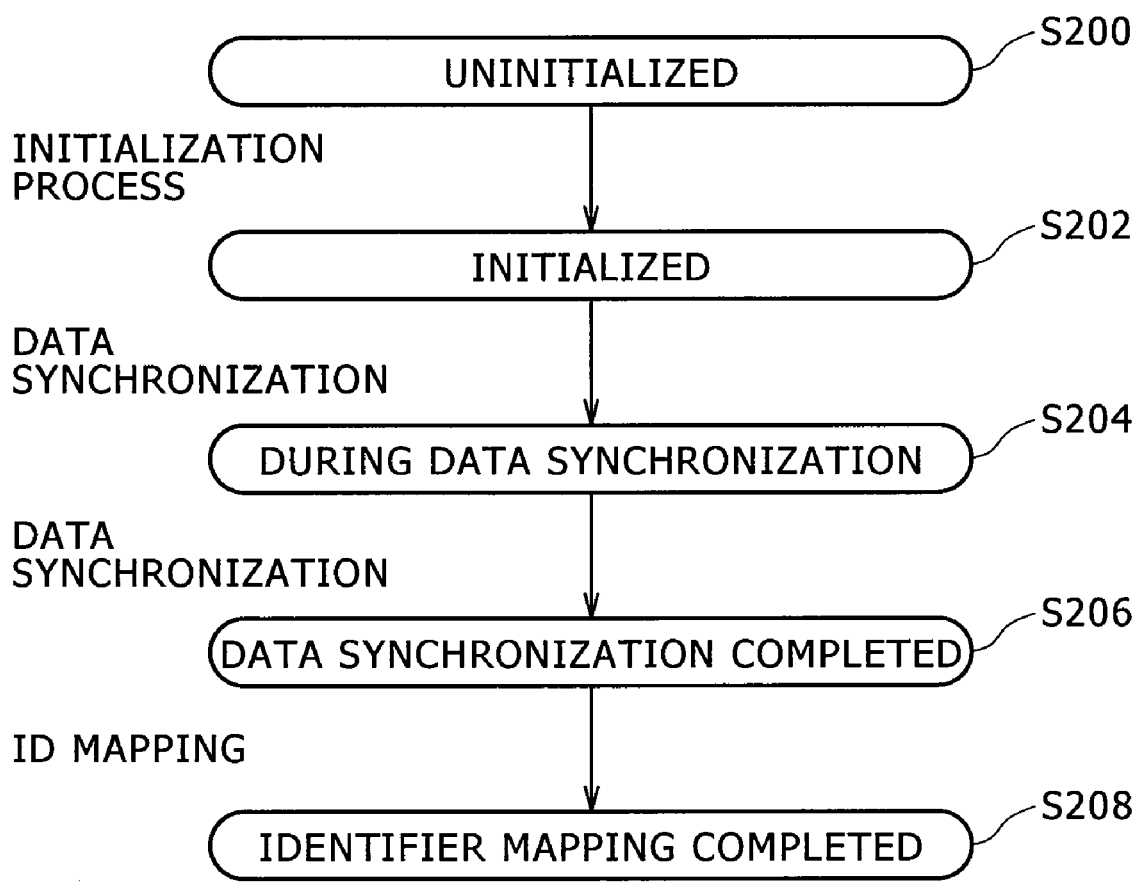
FIG. 25 is a diagram of an example of the state transition of communication in the data synchronization.

FIG. 24 is a flowchart of the procedure to receive a response from the synchronization server 104-B for the response relayed by the repeater 100-E. In F516, the load state D32 of the destination management information D30 is used, instead of the average response time D28 as used in F506 in FIG. 12 in the first embodiment. In F518, the load state D52 of the state management information D50 is used, instead of the average response time D44 as used in F508 in FIG. 12 in the first embodiment. The other processes of the fifth embodiment can be the same as the processes in FIGS. 10, 11, 12 in the first embodiment.

As described above, according to the fifth embodiment, the repeater 100-E obtains the processing capacity of the synchronization server 104-B for each database, as well as the information about the load of the message of each state to be placed on the process of the synchronization server 104-B, from the synchronization server 104-B. Thus, it is possible to provide a congestion control function of reducing the congestion in the synchronization server 104-B with requests based on the information obtained by the repeater 100-E.

Further, the fifth embodiment can be combined with the embodiments 2, 3, and 4.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A congestion control system provided on a network communication path coupling a terminal and a server device, the congestion control system comprising:
    a repeater for relaying a request from the terminal to the server device, and for relaying a response from the server device to the terminal;
    a determination unit for analyzing the response from the server device to determine the next state of the request from the terminal;
    a measurement unit for measuring the processing capacity of the server device for each request destination from the terminal;
    an estimation unit for estimating, for each server device, the load of the next request to be placed on the server device, based on the determined next state of the request as well as the measured processing capacity of the server device which is the destination of the request, and for adding the estimated load information to the response of the server device; and
    a regulation unit for analyzing the load information added to the request received from the terminal, determining whether or not to relay the request from the terminal to the server device based on the content of the load information, and when rejecting the request without being relayed, notifying the terminal that the request is not relayed.

2. The congestion control system according to claim 1, wherein the measurement unit determines the processing capacity of the server device based on the result of measuring the response time of the server device for the request relayed to the server device.

3. The congestion control system according to claim 1, wherein the estimation unit estimates the load of the request of each state to be placed on the server device, based on the response time of the server device for the request of each state measured by the measurement unit.

4. The congestion control system according to claim 1, further comprising
    a server state obtaining unit for receiving the information about the processing capacity of the server device as well as the load of the request of each state to be placed on the server device, from the server device.

5. The congestion control system according to claim 1, further comprising
    a server state obtaining unit for receiving the information about the processing capacity of the server device as well as the load of the request of each state to be placed on the server device, upon notification from the server device.

6. The congestion control system according to claim 1, further comprising
    an encryption/decryption unit for encrypting the load information included in the response to the terminal, and for decrypting the encrypted load information included in the request from the terminal.

7. The congestion control system according to claim 1, wherein the determination unit includes a state transition table having a combination of the current state of the request, the presence or absence of a specific tag included in the request, the value of the specific tag included in the request, and the next state of the request, thereby determining the next state of the request based on the state transition table.

8. The congestion control system according to claim 1, wherein, when rejecting the relay of the request by the load information included in the request, the regulation unit determines the load information with a low load level to be included in the next request based on the load information included in the request, and returns a regulation response including the load information.

9. The congestion control system according to claim 1, further comprising
    a repeater delay unit for delaying the relay of the request to the server device based on the load information included in the request.

10. The congestion control system according to claim 9, wherein the regulation unit determines the relay delay time to the server device, based on the congestion state of the server device as well as the load information included in the request,
    wherein the repeater delay unit delays the relay of the request to the server device based on the determined relay delay time.

* * * * *